Oct. 12, 1954     W. W. SLOANE     2,691,754
SAFETY CIRCUIT FOR MINE LOCOMOTIVES
Filed Nov. 26, 1951
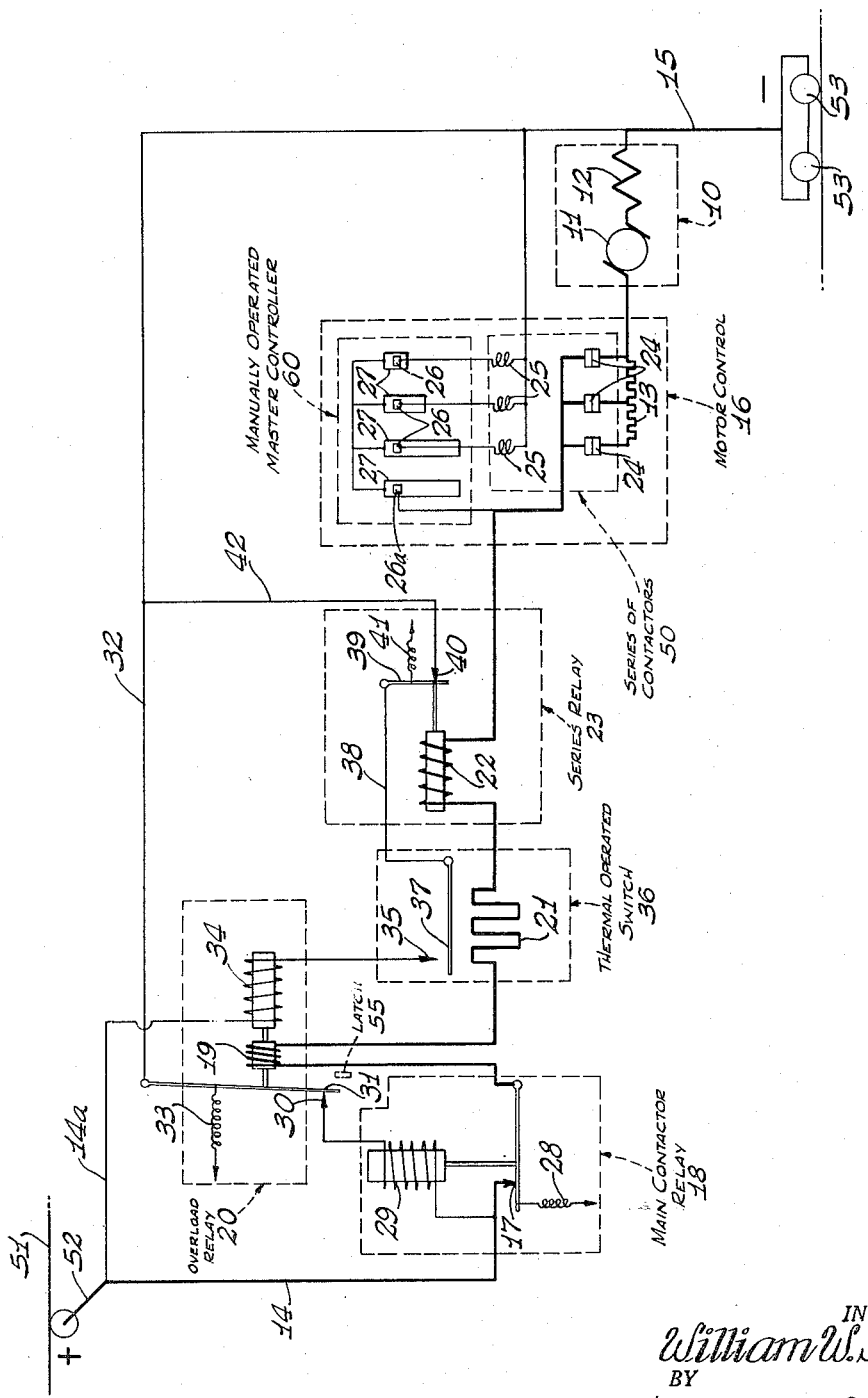
INVENTOR.
*William W. Sloane*
BY
*Murray G. Gleeson*
ATTORNEY

Patented Oct. 12, 1954

2,691,754

UNITED STATES PATENT OFFICE 2,691,754

SAFETY CIRCUIT FOR MINE LOCOMOTIVES

William W. Sloane, Chicago, Ill., assignor to Goodman Manufacturing Company, Chicago, Ill., a corporation of Illinois Application November 26, 1951, Serial No. 258,195

9 Claims. (Cl. 318—447)

This invention relates to improvements in safety control circuits for electric mine locomotives and has as its principal object to provide such a circuit which will delay automatic opening of the motor circuit due to overload currents used in climbing a grade until the locomotive and its trip are safely beyond the grade.

Another object of my invention is to provide a safety circuit for mine locomotives so arranged as to prevent stopping of the locomotive due to overload conditions, while traveling upgrade, but to stop the locomotive when the trip pulls beyond the grade and to hold the locomotive from starting until its motor or motors cool to a safe value.

A still further object of my invention is to provide an overload control circuit for mine locomotives wherein the overload relay for the locomotive is controlled by a thermal switch, and wherein the circuit through the thermal switch is broken upon overload conditions exceeding those required to close the thermal switch, to prevent operation of the overload relay, until subsequently when the excessive overload conditions are relieved.

A further and more detailed object of my invention is to provide a safety circuit for mine locomotives preventing the disconnection of the locomotive motor from the main power line upon overload conditions when traveling upgrade; by controlling the overload relay by a heater element in the locomotive power line and a thermal switch operated thereby, and by providing a relay to control the circuit to the thermal switch and normally biasing this relay to a closed position, and so proportioning the operating coil thereof that its strength will not overcome the bias of the relay until the current passing through the coil exceeds that which would close the thermal switch after a time lag following operation of said relay against its bias.

These and other objects of my invention will appear from time to time as the following specification proceeds and with reference to the accompanying drawing showing a schematic wiring diagram illustrating one embodiment of my invention.

In the illustrated embodiment of my invention, a motor 10 for the locomotive is shown as having an armature 11 and a series field 12. The motor may be a traction motor of a well known form commonly used to propel mine locomotives, and while one motor only is shown herein, it is understood that any number of motors required may be provided without alteration in the circuit.

The motor 10 may be connected in a main line circuit and started through resistance 13 under the control of a series of contactors 50 (including coils 25 and contacts 24) and a manually operated master controller 60 (including drum-carried contact segments 27, and fingers 26). The contactor series 50 and master controller 60 make up a motor control generally designated 16. Other forms of motor control may be used. A reverse drum (not shown) of a well known form, may also be connected in the circuit in a conventional manner to reverse the direction of travel of the locomotive.

Main line conductors 14 and 15 are provided to supply power to the locomotive motor 10. Said conductors may obtain power from a source of electric power, as through the trolley wire and pole 51 and 52 and track wheels 53 of the locomotive. The power may also come from a cable reel, or from storage batteries. The conductor 15 is shown as being connected with the motor field 12. The conductor 14 is shown as being connected with the armature 11 of said motor through contact 17 of a contactor or relay generally designated 18, a series coil 19 of an overload relay, a heater coil 21 of thermal operated switch 36, a coil 22 of a series relay 23, and contacts 24, 24 of the series generally designated 50 arranged to progressively cut portions of the resistance 13 from the motor circuit.

In the drawing, the control drum of the master controller 60 is shown in a full "on" position, the contacts 24, 24 being held closed by magnet coils 25, 25 of the contactor series 50 and connected between the coil 22 and conductor 15 in parallel with that portion of the circuit containing the motor 10. The circuit through the magnet coils 25, 25 is completed by contact fingers 26, 26 of the controller, engaging contact segments 27, 27 of the controller drums and connected with the conductor 14 through a contact finger 26a engaging an end contact segment of the controller drum 27 and connected with the coil 22 of the series relay 23, to connect the magnet coils to the line 15.

The main contactor relay 18 is shown as being biased to an open position by a spring 28 and as being urgeable to a closed position by a coil 29. The latter is directly connected with the line 14. It is indirectly connected with line 15 through a contact 30 and a contact arm 31 of overload relay 20 and through a conductor 32. The magnet coil 29 will thus be energized, and the circuit through contact 17 will be closed whenever the contact arm 31 is in engagement with the contact 30. A spring 33 is shown as biasing the contact arm 31 of the overload relay 20 in position to close its contacts.

The series coil 19 of the overload relay 20 is so proportioned that it does not have sufficient strength to operate the relay until extremely high current values flow through the circuit, such as may occur with a short circuit. When this occurs, the operation of the relay is instantaneous. The relay 20 will also be provided with customary latching means 55 for holding contact arm 31 open whenever opened by overload conditions. Manual or other suitable means will be provided for reclosing it when desired.

With no short in the motor circuit, the overload relay 20 will be opened upon overload conditions, to break the circuit between the contact 30 and contact arm 31, by means of a shunt coil 34, connected with the trolley line 51 through conductor 14a. The coil 34 is connected between the conductor 14a and the conductor 15 through a contact 35 of the thermally operated switch 36, herein illustratively shown as including a bimetal strip 37, and arranged to complete a circuit through the contact 35 upon a predetermined temperature rise, governed by the heater coil 21. The bimetal strip 37 is shown as being connected with a conductor 38 connected with a contact arm 39 of the relay 23. The contact arm 39 is normally urged to make contact with a contact 40 of said relay, by means of a spring 41. The contact 40 is connected with the conductor 32 through a conductor 42. The relay 23 is opened against the bias of the spring 41, by its coil 22, connected in series with the heater coil 21 and the motor 10. The series relay coil 22 is so proportioned that its strength will not overcome the spring 41 and open the relay 23, until the current passing through the coil 22 exceeds the current which would subsequently cause the bimetal strip 37 to close against its contact 35.

It will be understood that the heater coil 21 and the bimetal strip 37 are attempted to be so proportioned with regard to the motor 10 that said heater coil will cool at a rate approaching that of the motor 10, so as to maintain the circuit to the shunt coil 34 of the overload relay 20 closed upon closing of the relay 23 until the temperature value of the motor 10 is safe for running.

During operation of the locomotive under normal running conditions, the circuit through the contact 35 and arm 37 of the thermal operated switch 36 will normally be open. The contact 17 of the contactor 18 will be closed, as will the contacts of the overload relay 20 and the contacts 24, 24 of the controller. A circuit will thus be completed from the trolley line 51, conductor 14, contact 17 of the contactor 18, series overload relay coil 19, heater coil 21, series coil 22, certain or all of the contacts 24, 24 of the series 50, armature 11, field 12 and conductor 15.

When, however, overload conditions occur, as when climbing a grade, the heat generated by the heater coil 21 will tend to close the thermal switch 36 and energize the coil 34 of the overload relay 20. The series coil 22 of the relay 23, however, also reacts to this overload condition and is so proportioned that as soon as the current passing through it exceeds that which will create sufficient heat in the heater coil 21 to close the thermal switch 36 (after some lag), the series coil 22 will instantaneously open the contacts of the relay 23. The thermal switch 36 will subsequently close its contacts, but since the relay 23 is maintained open against the spring 41 as long as motor current is flowing, the circuit to the coil 34 of the overload relay will not be energized, and contact 30 of said relay will remain closed and the locomotive will continue to operate even under its overload conditions.

As the locomotive and trip passes beyond the grade, the overload will have been reduced with resultant decrease in the current demand. The spring 41 will then act against the coil 22 and close the contacts of the relay 23. Since the locomotive motor will have had no opportunity to cool and will still be overheated, the contacts of the thermally operated switch 36 will remain closed. This will energize the shunt coil 34 of the overload relay 20 and break the circuit to the coil 29 of the contactor 18. The spring 28 will then open the contacts of said contactor and disconnect the motor 10 from the main line circuit. The motor then cannot be re-started until the heater coil 21 and the bimetal strip 37 of the thermal switch 36 have cooled to where the circuit between the contact 35 and contact arm 37 opens, at which time the coil 34 will be deenergized. After the operator releases holding latch 55 (diagrammatically shown), the spring 33 will then move the contact arm 31 to complete the circuit through the magnet coil 29 of the contactor 18 and close said contactor and connect the circuit to again permit starting of the locomotive.

It may be seen from the foregoing that a novel and improved safety circuit has been provided, which is particularly adapted to a mine locomotive and prevents cutting out of the locomotive motor from the main line circuit as it overheats on a grade, thus permitting the locomotive and trip to run all the way up the grade, and then forces the locomotive to stop after it passes beyond the top of the grade, and the current demand has been reduced, and does not again connect the locomotive circuit to energize the motor until the locomotive motor has cooled to a safe temperature under control of the heater coil 21 and bimetal arm 37.

It may further be seen that the control circuit just described minimizes the likelihood of the locomotive losing its power and coasting back downhill with its trip of cars before the motorman can apply the brakes, due to overheating of the motor on account of overload conditions, and that this circuit besides increasing the safety in operation of the locomotive, preventing runaways and wrecks, also forces the locomotive to stop and cool off after the top of the hill has been reached and the overload conditions reduced.

It will be understood that various modifications and variations may be effected without departing from the spirit and scope of the novel concepts of the present invention.

I claim as my invention:

1. In a safety circuit for a mine locomotive, a motor, an energizing circuit for said motor, an overload relay having a shunt coil connected to and in parallel with said energizing circuit and having contacts operable to break said energizing circuit, a thermal operated switch having normally open contacts connected in series with said shunt coil for said overload relay and normally holding the circuit to said coil open to control operation of said overload relay, and circuit breaking means having normally closed contacts connected in series with the contacts of said thermal operated switch, and means opening said contacts upon overload, to open the circuit through said thermal operated switch upon overload creating sufficient heat to close said switch to assure continuous uphill operation of the locomotive regardless of overload conditions, and to close the circuit through said switch when the overload conditions are relieved.

2. In a safety circuit for a mine locomotive, a motor, an energizing circuit for said motor, an overload relay having a shunt coil connected to and in parallel with said energizing circuit, and having contacts connected to break said energizing circuit, a thermal operated switch having normally open contacts connected in series with said shunt coil and closed by heat, to control operation of said overload relay, a heater coil in series with said motor and transmitting heat to said thermal switch to close the same upon predetermined temperature rises, and a relay having its operating coil in series with said motor and having normally closed contacts connected in series with the contacts of said thermal operated switch and operable to open the circuit to the contacts of said thermal operated switch upon overload that will create sufficient heat to subsequently close said contacts of said thermal operated switch and hold the circuit to said shunt coil for said overload relay open, and to close the circuit to said contacts of said thermal operated switch when the overload conditions are relieved.

3. A safety circuit for a mine locomotive insuring uphill operation thereof regardless of overload conditions comprising a motor, a main line conductor for energizing said motor, an overload relay, a shunt coil connected to and in parallel with said main line conductor, and having contacts operable to break the circuit through said conductor, means to connect said shunt coil of said overload relay to and in parallel with said main line conductor to operate upon overload including a thermal operated switch having normally open contacts in series with said shunt coil and closed by predetermined heat conditions, a second switch in series with said thermal operated switch and having contacts normally biased in a closed position, and a series coil in said main line conductor, for opening the contacts of said second switch against its bias upon overload sufficient to close said thermal operated switch.

4. In a safety circuit for mine locomotives assuring continuous uphill operation of the locomotive regardless of the overloaded condition thereof, a traction motor, an energizing circuit to said motor including a main line conductor connected with said motor, a contactor having contacts connected in said main line conductor, to break the circuit therethrough upon overload conditions and having an operating coil connected to said main line conductor and being in parallel with said motor and normally holding said contacts closed, an overload relay having contacts biased in a closed position and connected in series with said operating coil for said overload relay, and having an operating coil connected in parallel with said motor to open the circuit through said overload relay upon overload conditions, a thermal switch having contacts connected in series with said operating coil for said overload relay and normally holding the circuit thereto open and closing upon predetermined temperature rises to close the circuit to said last-mentioned operating coil, to energize said coil for said overload relay and operate said relay to open its contacts and the circuit to the operating coil for said contactor, and a relay having normally closed contacts in series with the contacts of said thermal switch and normally holding the circuit to the contacts of said thermal operated switch closed, and having a series coil connected in said main line conductor and energizable to open the contacts of said relay and the circuit to said thermal contacts upon overload conditions exceeding those which would create sufficient heat to cause said thermal switch subsequently to close its contacts, and thereby to prevent energization of said overload relay coil until motor overload conditions are relieved.

5. A safety circuit for mine locomotives comprising a motor, a power circuit to said motor including a main line conductor, a contactor having its contacts in said conductor, to break the circuit therethrough, a coil for said contactor connected to said conductor and in parallel with said motor, an overload relay having normally closed contacts connected in series with said coil to break the circuit thereto, and having an operating coil connected to said main line conductor and being in parallel with said motor, a heater coil in said conductor in series with said motor, a normally open bi-metal switch in series with said operating coil for said overload relay, and closing upon predetermined temperature rises transmitted thereto by said heater coil, to complete a circuit to energize said operating coil for said overload relay, to open said overload relay contacts, and means normally holding the circuit to said bi-metal switch closed, but opening the circuit thereto upon overload conditions exceeding those which would cause said bi-metal switch to close including a relay having its contacts in series with the contacts of said bi-metal switch, a spring biasing said relay into a closed condition, and a series coil in said main line conductor in series with said motor for operating said last-mentioned relay, said series coil being so proportioned with respect to said spring as to open the contacts of said relay upon overload conditions exceeding those which would subsequently cause said bi-metal switch to close, and said spring closing said relay contacts against said series coil upon relief of said overload conditions.

6. In an electric safety circuit, a motor, an energizing circuit for said motor including a main line conductor, an overload relay having a shunt operating coil connected to and parallel with said main line conductor and having normally closed contacts operable to break the circuit to said motor through said main line conductor upon predetermined overload conditions, the parallel connection of said shunt coil to said main line conductor including a thermal operated switch having contacts connected in series with said shunt coil and closing upon predetermined heat conditions, a second relay having normally closed contacts connected in series with the contacts of said thermal operated switch, said second relay having a series operating coil connected in said main line conductor and operable to open said contacts of said second relay upon overload conditions creating sufficient heat to subsequently cause said thermal operated switch to close its contacts 7. In an electric safety circuit, a motor, an energizing circuit for said motor including a main line conductor and a second conductor connected to said main line conductor and being in parallel with said motor, an overload relay having a shunt operating coil connected in said second conductor and also having contacts normally closed and connected to maintain said main line conductor energized under normal operating conditions, a thermal switch having contacts connected in said second conductor in series with said shunt operating coil of said relay and normally holding the circuit to said coil open, a heater coil connected in said main line conductor in series with said motor and operable to heat said thermal switch and close the contacts of said thermal operated switch upon predetermined overload conditions, a second relay having contacts connected in said second conductor in series with the contacts of said thermal operated switch and normally closed to maintain a circuit thereto, said second relay having an operating coil in said main line conductor in series with said heater coil and so proportioned as to open the contacts of said second relay when the current passing through it exceeds that which would raise the temperature of said heater coil to an extent to subsequently cause said thermal operated switch to close its contacts and open said relay, and thereby to prevent operation of said overload relay until the overload conditions are relieved 8. In a safety circuit for a mine locomotive comprising a motor, a main line circuit for energizing said motor, an overload relay having contacts connected to break said main line circuit upon overload conditions and having a shunt operating coil connected to and in parallel with said main line circuit, the parallel circuit from said shunt coil to said main line circuit including a thermal operated switch having contacts normally open, to open the circuit through said coil, and closed by heat, a second switch having contacts connected in series with the contacts of said thermal operated switch and biased into a closed position, and a series coil in said main line circuit for opening said second switch against its bias upon overload conditions which would normally create sufficient heat to close said thermal switch and effect opening of said overload relay.

9. A safety circuit for a mine locomotive insuring continuous uphill operation thereof regardless of overload conditions comprising a motor, a main line conductor for energizing said motor, an overload relay having contacts connected to break the energizing circuit through said main line conductor to said motor, and having a shunt coil for operating said relay connected to and in parallel with said main line conductor, means to connect said shunt coil in parallel with said main line conductor to operate said relay upon overload conditions including a thermal operated switch comprising a bi-metal strip movable upon predetermined heat conditions to complete a circuit through said shunt coil and a heater coil connected in said main line conductor in series with said motor for transferring heat to said bi-metal strip, a second relay having normally closed contacts connected in series with the contacts of said thermal operated switch, a spring biasing the contacts of said second relay into a closed position, and an operating coil for said second relay connected in said main line conductor in series with said heater coil and so proportioned as to overcome the spring bias of said second relay when the current passing through it exceeds that which would subsequently create sufficient heat in said heater coil to cause the thermal operated switch to close its contacts.

References Cited in the file of this patent

UNITED STATES PATENTS

| Number | Name | Date |
|---|---|---|
| 1,312,757 | Smith | Aug. 12, 1919 |
| 1,584,356 | Chandler | May 11, 1926 |
| 1,871,875 | Bradford | Aug. 16, 1932 |